(12) United States Patent
Sklovsky

(10) Patent No.: US 6,710,578 B1
(45) Date of Patent: Mar. 23, 2004

(54) POWER RESOURCE MANAGEMENT IN A PORTABLE COMMUNICATION DEVICE

(75) Inventor: Vladimir Sklovsky, Vernon Hills, IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 10/228,592

(22) Filed: Aug. 27, 2002

(51) Int. Cl.⁷ ................................................. H02J 7/00
(52) U.S. Cl. ....................................................... 320/127
(58) Field of Search ................................ 320/127, 132, 320/133; 455/566, 571, 572, 573, 574, 575, 90, 550, 343, 127; 324/427, 428; 429/90–93

(56) References Cited

U.S. PATENT DOCUMENTS

| 5,248,929 A | 9/1993 | Burke | 320/127 |
| 6,025,695 A * | 2/2000 | Friel et al. | 320/106 |
| 6,408,196 B2 * | 6/2002 | Sheynblat et al. | 455/574 |

OTHER PUBLICATIONS

"Reduce the Frequency and Save 50% Power." *Portable Design*, Feb. 2000, pp. 11–20.

* cited by examiner

Primary Examiner—Pia Tibbits
(74) Attorney, Agent, or Firm—Brian M. Mancini

(57) ABSTRACT

A method for power resource management in a portable communication device includes a first step (200) of defining power profiles of a plurality of operational modes of the communication device. A next step (202) includes calculating available power. A next step (204) includes inputting operating parameters of a selected operational mode. A next step (206) includes predicting whether there is sufficient power to operate the selected mode before entry therein, such that, if there is insufficient power, restricting (208) operation of one of the operational modes before entry into the selected mode, thereby preemptively preventing problems that can occur when power becomes exhausted in a portable device.

20 Claims, 3 Drawing Sheets

POWER RESOURCE MANAGEMENT IN A PORTABLE COMMUNICATION DEVICE

FIELD OF THE INVENTION

The present invention generally relates to reducing power consumption in a communication device. More particularly, the present invention relates to power management in a portable radiotelephone.

BACKGROUND OF THE INVENTION

Many communication devices operate on battery power. The radiotelephones in use today are almost all portable devices utilizing batteries that need periodic recharging. The size of the battery and the power efficiency of the communication device determine the amount of talk time available to a user. As a convenience to a user, it has always been desirable to extend the life of the battery to provide longer talk times. However, even with the present devices, communications are occasionally interrupted, requiring the recharging of the battery or replacement with a freshly recharged battery.

Moreover, new phone features and standards are dramatically elevating phone functions, which increase processing power requirements. Such new features and functions include Internet browser capability, wireless multimedia, smart phones and videophones, for example. These requirements also increase processing speed, which is known to increase current drain. High speed packet data, data and image processing, General Packet Radio Service, Global Positioning System service, local connectivity services to a computer or peripherals, multimedia cards, and multiple high processing functions all require an increased level of processor operational speed, hardware accelerators, more complicated hardware and software, larger and more complicated instruction sets. Further, the phone may be called upon to power additional phone modules that plug into the phone.

As a result, the operational frequency of the phone processor has increased and the number of transistors on the phone IC sets has increased to support these new functions and interfaces. Modern silicon technology has been improving, but has not kept pace with the functional revolution in phone technology. Consequently, the power demands on a phone has been constantly increasing. Therefore, it has been desirable to further extend the battery life on a communication device.

At the same time, there are limiting factors in the phone themselves. New phones must be as small or smaller than the phones they are replacing. Therefore, batteries must be smaller. In addition, the amount of power dissipation is limited by the smaller package, existing silicon technology, and the temperature limits of components in the phone. Further, the battery technology is not able to provide the necessary current for a sufficient time in some of the desirable or simultaneous user modes. For example, a wireless packet data connection in GPRS for an Internet browser, or local connectivity to a computer and multimedia functions, would have a high current drain on a battery.

There are several existing power management techniques to reduce power consumption of phone circuits and processors. These techniques include (US patent class 713/320) lowering voltage, frequency modulation, lowering frequency, gating clocks and/or transmitter/receiver, shutdown components in the phone that are not being used at the time (standby/sleep mode), etc. However, these techniques are reactive in that they will still provide full operability of the phone even though the battery may not be able to supply sufficient power for all functions.

Accordingly, there is a need for a method and apparatus for predictive current reduction and extension of a battery lifetime in a communication device such as a radiotelephone. There is a further need to provide user input and options as to the operability of particular functions of the phone. It would also be of benefit to provide these advantages without additional hardware, which would increase the cost of the communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF A PREFERRED EMBODIMENT

The present invention reduces the current drain in a communication device by predicting the current drain for a particular application in a communication device before entering and running such. In addition, where there is a potential to exceed battery capacity, the present invention provides for user input to direct the functionality of the phone instead of the phone dropping applications on its own, which is undesirable. It also reduces the total current drain and extends the battery life of a device by limiting the amount of information processed, transmitted and received by the device, and in particular, by wireless connectivity, which usually takes the most power consumption. This is accomplished in a phone without additional hardware, which would increase the cost of the communication device.

Advantageously, the present invention predicts power consumption based on power or current profiles for every operational mode for optimizing user utilization of a communication device, such as a radiotelephone.

Figure 1:
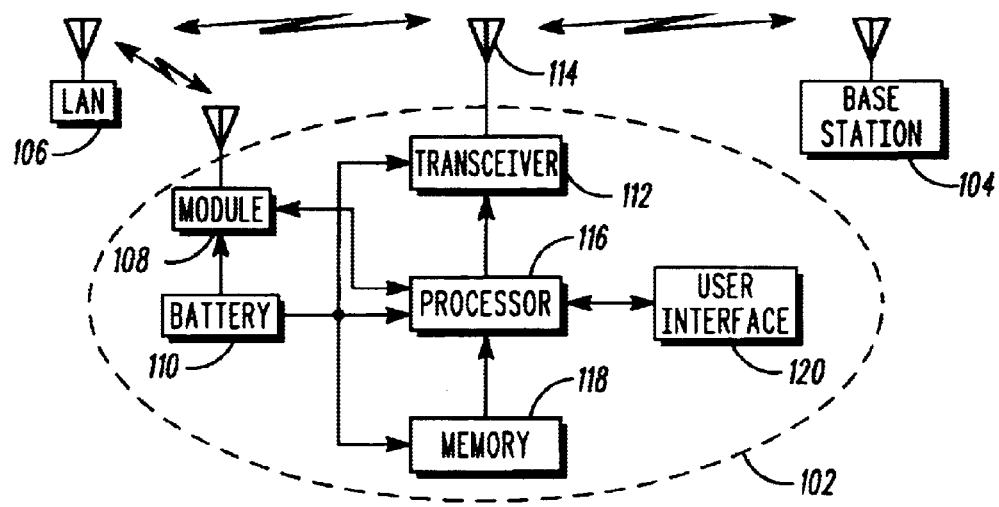
FIG. 1 is a simplified schematic diagram of a communication system, in accordance with the present invention.

Referring now to FIG. 1, a radiotelephone system 100 includes a radiotelephone 102 with components powered by a battery 110. Preferably, the battery is rechargeable. The radiotelephone 102 is configured to provide a communication connect to a base station 104. This connection can be in any standard communication system and can be to a wide area network access, for example. The radiotelephone 102 can also be configured to accommodate local connectivity, such as to local area network (LAN) 106. This connection can be wired or wireless. Optionally, local connectivity can be provided to the LAN 106 through a module 108 made for that purpose. This connection can also be wired or wireless. The module 108 may contain its own power source, or it can be coupled to the radiotelephone 102 to draw power directly from the battery 110.

The radiotelephone 102 includes transceiver 112 coupled to one or more antennas 114. The radiotelephone is controlled by a processor 116 that is generally coupled to all the components of the radiotelephone 102. The processor 116 can be a microprocessor, microcontroller, DSP, combination of both, or other similar control circuit. The processor 116 obtains its instructions from a memory 118. The memory can be a static, dynamic, flash or erasable memory of a ROM or RAM configuration. Along with the standard uses for memory, the memory 118 can also contain many different applications to provide various functions of the radiotelephone. Optionally, the processor can also down load application from the base station 104 and/or LAN 106, that can be stored in memory 118. A user interface 120 is coupled to the processor to provide and receive user information. The user interface typically includes a display, a keypad, a microphone and an earpiece with speaker. It should be recognized that there are many other devices necessary in the operation of the radiotelephone that are not shown, to avoid confusion.

The antenna 114 receives signals from the base station 104 or from local connection 106 in the vicinity. Received signals are converted to electrical signals by the antenna 114 and provided to the transceiver 112 to provide conversion to baseband or data signals. The transceiver 112 includes an amplifier and other circuitry, such as RF circuits and demodulation circuitry, as is known in the art. The baseband or data signals are provided to the other circuits (not shown) in the radiotelephone 104, which converts them to streams of digital data for further processing. Similarly, the radiotelephone 102 provides data or baseband signals through modulation circuitry (not shown) in the transceiver 112, which sends electrical signals to the antenna 114 for transmission to the base station 102 or LAN 106. Typically, a transmitter power amplifier consumes the most power in the radiotelephone 102.

The processor 116 controls the functions of the radiotelephone 102. The processor 116 operates in response to stored programs of instructions, and can load such stored programs as needed to provide a particular function of the radiotelephone 102. The present invention defines a method to reduce the current drain in the receiver by predicting the current drain for a particular application in a communication device before entering and running such application. It also reduces the total current drain and extends the battery life of a device by dynamically limiting the amount of information processed, transmitted and received by the device. In addition, user input is solicited to direct the functionality of the phone instead of the phone dropping or restricting applications on its own as power is exhausted, which is undesirable. In contrast, prior art techniques address power problems as they occur and do not consider the power consequences before a function is started.

In its simplest form, the present invention provides either full application operability, alternative operation in low power mode, or restricted operability, as described above. This can include alternative, low power operations, restriction of some high current modes, and utilization of function usage profiles and predicting current drain in any phone operations prior to entering a desired operation. Specifically, the present invention provides three main power modes: maximum performance, power saving mode, and low battery mode. In the maximum performance mode, the processor allows the phone to activate any functional modes and their combinations. These modes and their operational parameters can be pre-defined by a user, if desired. The limiting factors are only maximum current draw or excessive temperature resulting from a particular mode combination. For example, in some modes, current drain will exceed the current limit and the phone protection circuits shut down the phone. This can occur when connecting some accessories to the phone, which have power supplied by the phone, and activation some high power consumption modes simultaneously. Based on power profiles and system configuration, the processor can predict the phone total current drain before actual entering into this mode and provide advice to the user through the user interface (on the display screen for example) to change mode or operating configuration without shutting down the communication device. In some other modes, or particular mode combination, the internal phone temperature can exceed the temperature limit, and the phone would be shut down by temperature protection circuitry. Based on power profiles and system configuration, the processor can predict the phone total current drain before actual entering into this mode and provide advice to the user (on the screen) to change mode or system configuration without shutting down the device.

In the power saving mode, the present invention can use various novel techniques to reduce current drain on the battery. As is well known, power consumption can depend upon the amount of information processing by the phone. This includes transmitting/receiving information and using algorithms, which are required to process this information. Information and algorithms are both represented by the amount of bits in a digital bitstream in the phone. The more bits there are, the more active time of the phone components and digital gate switching activity are required, and the more power is needed to support this activity. The power saving mode reduces the amount of information to lower current drain.

The main techniques of the power saving mode are: a) to limit the amount of information processed, transmitted and received by the phone, especially by wireless connectivity, which usually takes the most power consumption, b) to use transmission protocols requiring lower amounts of information, c) to use some modes of the phone features and functions that do not use complicated algorithms to process the data, d) to use a simpler presentation of information that does not requires large amount of bits (text or graphics), e) to change to a connectivity interface requiring lower power consumption, and f) to restrict (terminate) some services (functions) requiring higher levels of power consumption and not being of a high priority for the user at some particular time (e.g. paging, WAP, and GPS that a user can set up).

The main advantage in power saving mode is to provide solutions that provide a compromise between the phone performance and quality, the amount of processing information, and the ability to get the required information during all active phone time without terminating the service to recharge the battery. The user might not to have opportunity to directly intervene to do this in some conditions. Therefore, the processor can enter power saving mode autonomously. Optionally, the user can setup predefined preferences of power saving modes, i.e. prioritize which power saving techniques to use. Additionally, the processor can be setup by the user to notify the user, through the user interface, in real time to select a power saving technique as needed.

Most of a phone's power consumption is drawn by circuits in active modes, such as the radio transceiver that transfers data in and out of the phone (a transmission required power amplifier uses the most power), and the processor that process the required information. Some of this is under control of the communication system, and not controlled by the device itself. In addition, most data are encoded in a fairly complicated way, in multiple layers, which requires a high level of processing by the device main processors and DSPs, which transfer data between internal multiple modules with high speed.

The present invention is able to lower the amount of information transferred in the power saving mode. For example, multimedia video standard MPEG-4 assumes four profile levels: level 1—176×144 QCIF with bit rate 64 kbps; level 2—352×288 QCIF with 128 kbps, level3—CIF with 384 kbps; level 4—CIF with 2 Mbps. By selecting a lower profile level, the user will receive a smaller picture size, loaded at a lower speed. As a result, the user receives picture with less quality, than he can get at the maximum profile level, but the user would be able to receive more required pictures with the same battery capacity or to save power for other functions. The same might be applied to the use of an Internet browser through wireless application protocol (WAP), selecting a lower amount of a data transmission (for instance, only text information with limited graphic and audio information, etc.).

Further, the present invention allows the changing of the protocol for receiving data, e.g. canceling an Internet browser via WAP and using only Short Message Service (SMS), which provides usually minimum text information about the latest news. Along these lines, the processor can change the data transmission from a wireless connectivity (from a LAN such as Bluetooth™, for instance, which requires significantly more power) to lower powered USB or RS232 interfaces. Additionally, the processor can restrict or terminate some services (functions) that require a higher level of power consumption and have been identified as a lower priority for the user in some particular time. These services can include an Internet browser, GPS, "blue tooth" connectivity, etc. Further, the processor can have multiple power saving modes, which depend on extended functions of the phone and its configuration.

In the low battery mode, the processor identifies conditions where available power (i.e. the battery capacity) would not be sufficient to provide some functional mode that requires significant power consumption and would discharge the battery or exceed battery capacity. The processor can enter into this mode automatically, based on power profiles and battery capacity, or through user intervention, as previously described. Specifically, the processor can restrict entry into a functional mode that would shut down immediately the phone as result of completely discharging the battery due to significant continuous power consumption. This restricted entry occurs before entering into the functional mode, thereby preventing the loss of internal information in memory (SRAM, SDRAM) under power from the battery. For example, the wireless (cellular) connectivity required to transmit data or to make regular phone calls requires a significant amount of energy. If this function cannot be supplied from the battery in low battery mode, the processor will notify the user about the low battery condition and restrict entry pending further user instruction. Advantageously, the user can still be allowed access to internal phone information, such as notebook, address book, which can be displayed without significant power consumption.

In operation, the communication device has predefined power mode parameters, which are correlated by: available power or existing battery capacity, the provided functions and the typical power or current profile for each provided function, and existing wireless communication conditions. Obviously, battery capacity must be known to manage power in the device. In addition, the current profile of a function should be known and measured against battery capacity. Moreover, the communication system dictates how much transmitter power is used, depending on the air interface conditions, which directly impact current usage. These parameters must be balanced against the chosen phone configuration and the user priorities.

The user can predefine options to address the management of power modes. For example, the user can set up the options for: a) the priority of the available phone functions, b) the list of functions to be restricted in the power saving or low battery modes, c) the user interface technique used by the device to inform the user, the time interval and/or battery capacity that switches the device in to or out of power saving mode or exit from the one, and e) selecting from a list of proposed battery saving modes parameters from the device, among others.

Preferably, the system (processor) will provide recommendations (advise) to the user about the optimum way to use functional modes or their combinations, based on the functional conditions of the device and the user setup options. For instance, the processor, through the user interface, can recommend not using a radio communication mode to save battery capacity to keep the user (phone) internal data saved until recharging. However, the user can make a few calls in the case of emergency or high priority, and System will estimate and give to user the active time, based on battery capacity. In another example, the device can notify the user about power condition changes, using the phone display, speaker or alarm signal. In all cases, the user is able to receive from the device battery capacity value and the average active time range for every functional mode.

The present invention is advice based. Although, the invention can include some actions that are taken autonomously, with or without predefined user preferences, priorities or instructions. The device provides its own recommendations to the user on how to optimize battery life time, given an existing battery capacity, user priority, existing environmental conditions, and desired functional modes. The present invention is interactive. A user can set up options for particular power modes (the function priority, the list of functions that have to be restricted in power saving or low battery modes) or select battery saving mode parameters proposed by the device. It should be recognized that the device can provide automatic power cuts for some modes or their combinations, such as due to existing battery capacity, ambient and phone internal temperature, and the phone system configuration.

Figure 2:
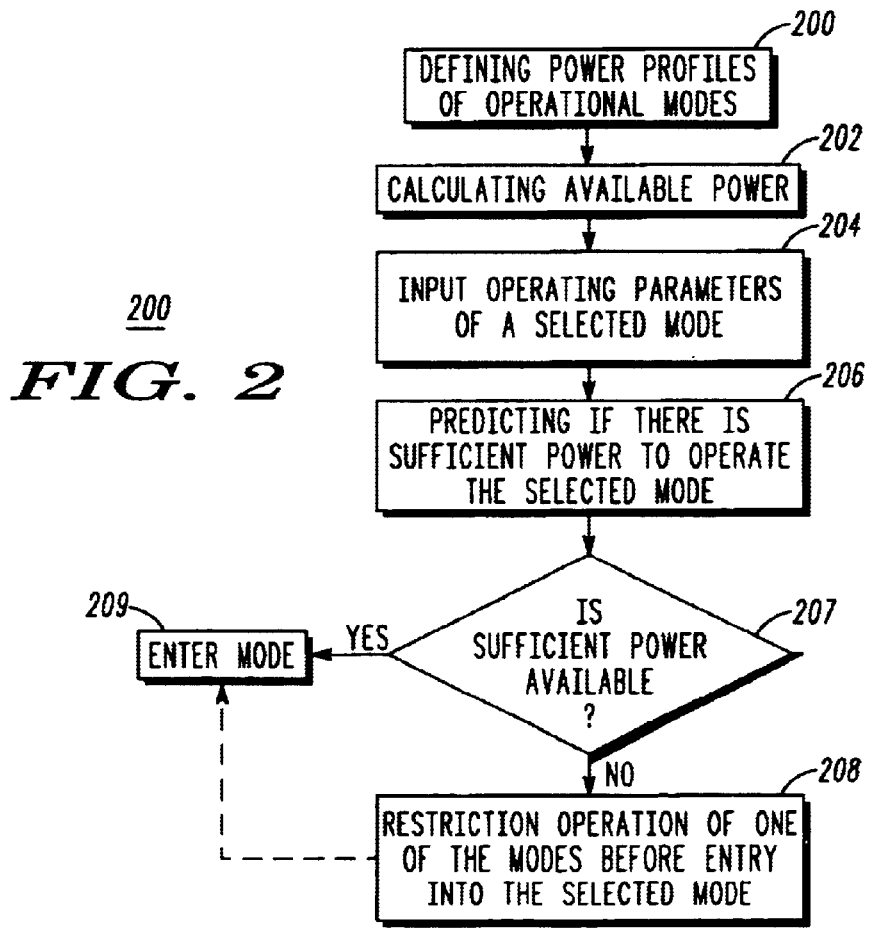
FIG. 2 is a flow chart for a method of power resource management in a communication device, in accordance with the present invention.

FIG. 2 shows a method for power resource management in a portable communication device, in accordance with the present invention. A first step 200 includes defining typical power and usage profiles of a plurality of operational modes of the communication device. Power profiles typically include current required over time. Usage can also be defined in terms of power or instantaneous current usage, for example. Usage can be assumed by predefined, typical current profile that can be expected in the operation of a particular function, or can be monitored in real-time. Of particular importance is the expected maximum current draw that can be expected during the function of the operational mode. It is also important to note the timing of the current usage or power profile, for if two operational modes have a combined maximum current that is more than the battery capacity, but these maximums come at different times, it may still be safe to operate the device in maximum performance mode. In addition, batteries can provide current bursts over short periods that can exceed the average available current.

A next step 202 includes calculating available power in the communication device. Typically, this is the battery capacity of the communication device. Obviously, this must be known or monitored, as it is the resource to be managed. Optionally, the device should be able to recognize when there is an external power source (e.g. it is in a charging cradle), wherein the device can bypass its power saving or low battery modes.

A next step 204 includes inputting operating parameters of a selected operational mode. This operating parameters can include, priorities of the operational mode, settings for preferred user interface of data such as how power management information is displayed, level of user interaction with the operating parameters, prioritized data rates, desired transmission protocol, required quality levels, desired connectivity interface, how the device should handle low-power conditions, data rates, etc. Also, parameters should include time intervals (durations) of required operations in different modes, which might be set up by user requirements or by system based on typical usage profiles and required total time of a phone operation. The operating parameters of any selected mode can be predefined by a user of the communication device, or can be selected automatically or by the user before entry into a selected operational mode. The user can be warned of the low-power condition, and can be provided with instructional advice as to possible techniques to for changing the operating parameters of one or more of the operating mode to alleviate power consumption. Optionally, the device can save internal data of the communication device to a static random access memory, if power-loss is imminent.

A next step 206 includes predicting whether there is sufficient available power capacity to operate the selected operational mode before entry into the selected operational mode. Based on step 204, the system updates power profiles for the particular user requirements. Based on power profiles, which defines power (current drain), and the times of operation in every required modes (from 204) the system are able to calculate required battery capacity (energy) for the required operations (multiply power in particular operational mode and time interval for this mode).

If there is sufficient power (207), then entering (209) the selected mode is permitted. However, if there is insufficient available power (207), the steps (208) are taken for restricting operation of at least one of the operational modes of the communication device before entry into the selected operational mode. In this case, the selected mode can be restricted, or other presently operating modes can be restricted to provide sufficient power levels for each.

The restricting step 208 can include totally preventing entry into the selected operational mode, or it can providing a user of the communication device the option of changing the operating parameters of the selected operational mode to allow entry therein. This can include a list of parameters on a display or it can be a prompt that advises a user what options can be taken to lower power consumption. Alternatively, the restricting step 208 can include automatically changing the operation of the selected operational mode or other operational modes according to the associated operating parameters of that mode to allow entry into the selected operational mode. Preferably, the restricting step 208 can include dynamically limiting information processing, data receiving and data transmitting. The term "limiting" is to be interpreted in the conventional sense wherein the amount of information to be transferred can be limited, not to exceed to a certain amount. The term "dynamically is to be interpreted in the conventional sense wherein the limit is not static and is allowed to change over time. For example, restricting can include automatically changing ("dynamically limiting") information transfer protocols to achieve lower data rates, which in turn lowers current drain. Where the operating parameters include priority of operational modes, the restricting step 208 can include eliminating lower priority operational modes.

A preferred technique to restrict operation of a mode is to limit informational flow or data rate. Specifically, this can include: limiting the amount of information processed, using an transmission protocol requiring less information, reducing information display, changing to a connectivity interface with lower current consumption, prioritizing processor functions, lowering the quality of transmitted information, changing information protocols, and using operating modes with less processor computations.

The predicting step 206 can include calculating the existing power load or current drain of the communication device including all presently operating modes, and comparing the combination of the existing power load and the usage profile of the selected operational mode to the available power (i.e. battery capacity). The power profiles include power values for every operational mode, including any combination of simultaneous performance. Preferably, the power profiles of all the existing operational modes and processor functions and the desired operational mode are combined into a total operating profile and compared to the available battery capacity.

In the power saving mode embodiment of the present invention, the operating parameters of the inputting step 204 include a time period and a required minimum power capacity for operation of the selected operational mode. In this case, the predicting step 206 includes predicting whether there is sufficient power to operate the selected operational mode at the minimum power capacity during the defined time period. If it is discovered that there is insufficient power, this embodiment restricts 208 operation of operational modes that are presently operating (i.e. earlier than the define time period) to provide the required minimum power capacity for operation of the selected operational mode during the time period.

In a preferred embodiment, the available capacity in the communication device is monitored on a periodic or constant basis. Also, the power load is dynamically measured during operation, and the power profile along with the required capacity requirements, are updated. If at any time the current capacity of the device will be exceeded, then operation of the device can be restricted, as previously described, before available power is exceeded.

The selective restriction of operation in some modes can be utilized to provide emergency calling, for example. For example, if a battery is close its end of charge, the system can save reserved battery capacity for the some emergency calls, restricting all other operations, which cause a discharge of the battery. Also, if the battery is near the end of its life, and any wireless connectivities will cause of significant dropping of the voltage and immediate shut down of the phone with losing information, the selective restricting mode will allow a user to watch and save the phone information before a shut down.

Figure 3:
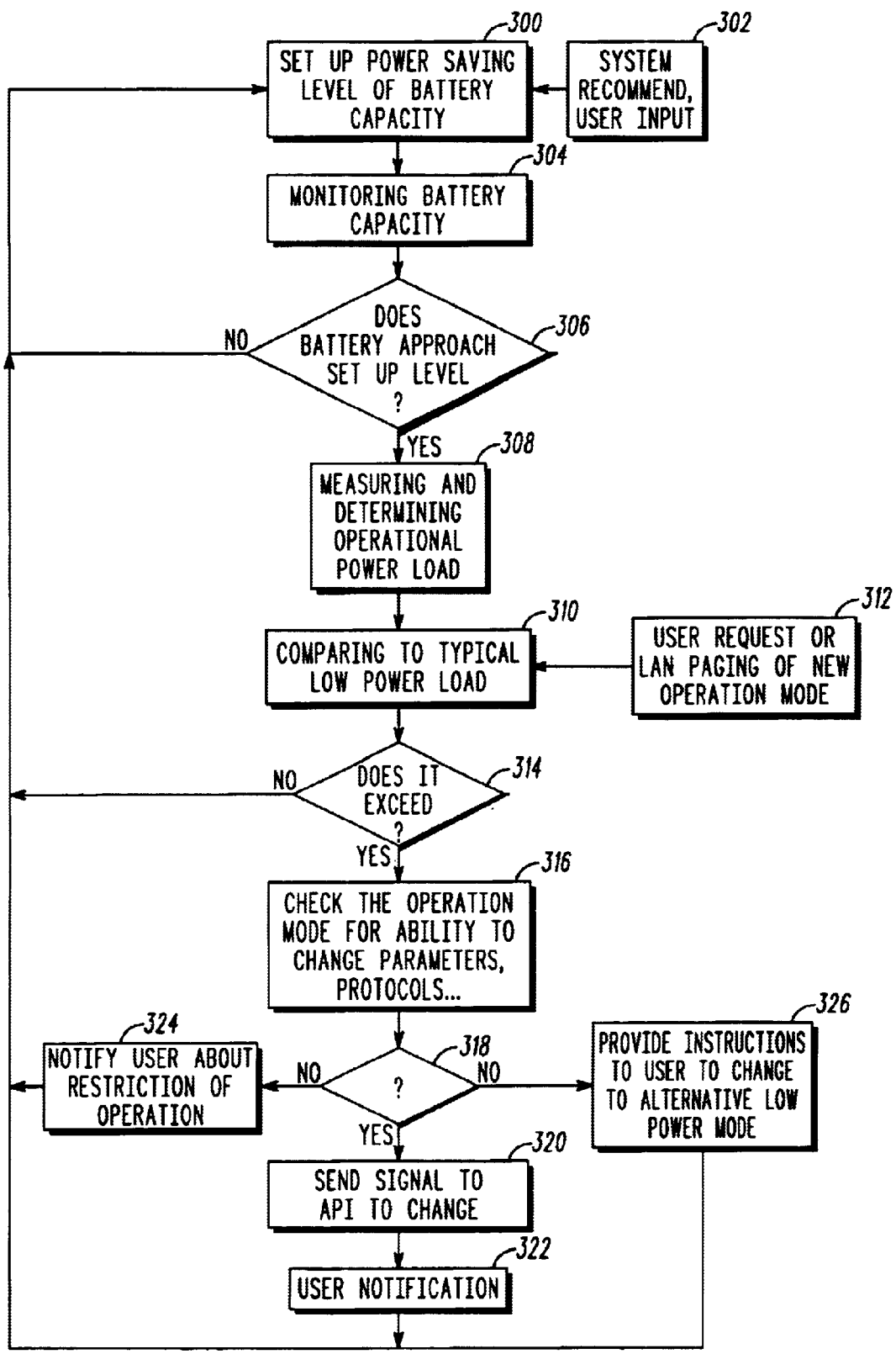
FIG. 3 is a flow chart for a first embodiment of the method of FIG. 2.

FIG. 3 demonstrates a detailed flow of a specific first embodiment of the present invention based on minimizing of processing information and battery capacity. The system enters in this mode automatically upon the approach 306 of a particular level of the battery capacity. The level is defined 300 as a percentage of a battery total capacity, which can be recommended by the system or set up by user 302, and which is monitored 304 by the system. This percentage defines the level of battery capacitor, and when it becomes insufficient for full operation.

During a particular operation, the system determines 308 (i.e. measures or estimates) the power load, compares to the typical power profiles for this mode. (New operational modes can be requested 312 or supplied from a local area network.) In defining a typical low power load 310, for every kind of operational mode of the system, besides the power profile (which can be updated automatically based on the real measurements in this mode and statistics), the system keeps in memory the power of alternative solutions, which provide the same functionality but with lower power (e.g. parameters, protocol different, with less quality or performance . . . ), or alternative functionality (e.g. USB versus Blue Tooth connection).

If the operational load exceeds the typical low power load 314, the system looks for 316 what kind of alternative solutions are available or have been used for the selected operational mode. If such solution is available 318 (i.e. the system has a possibility to use another data protocol or format to reduce power), then the system can request 320 the API (software application interface) to change to this lower power mode. The user can be notified 322 of this change. However, if a solution is not available 318, the system can either provide 326 some recommendation or advise to user to change of the operational mode based on above described low power methods and techniques (e.g. change wireless BlueTooth™ connectivity to wire USB, for example), or can notify 324 the user of restricted operation, as described previously.

Figure 4:
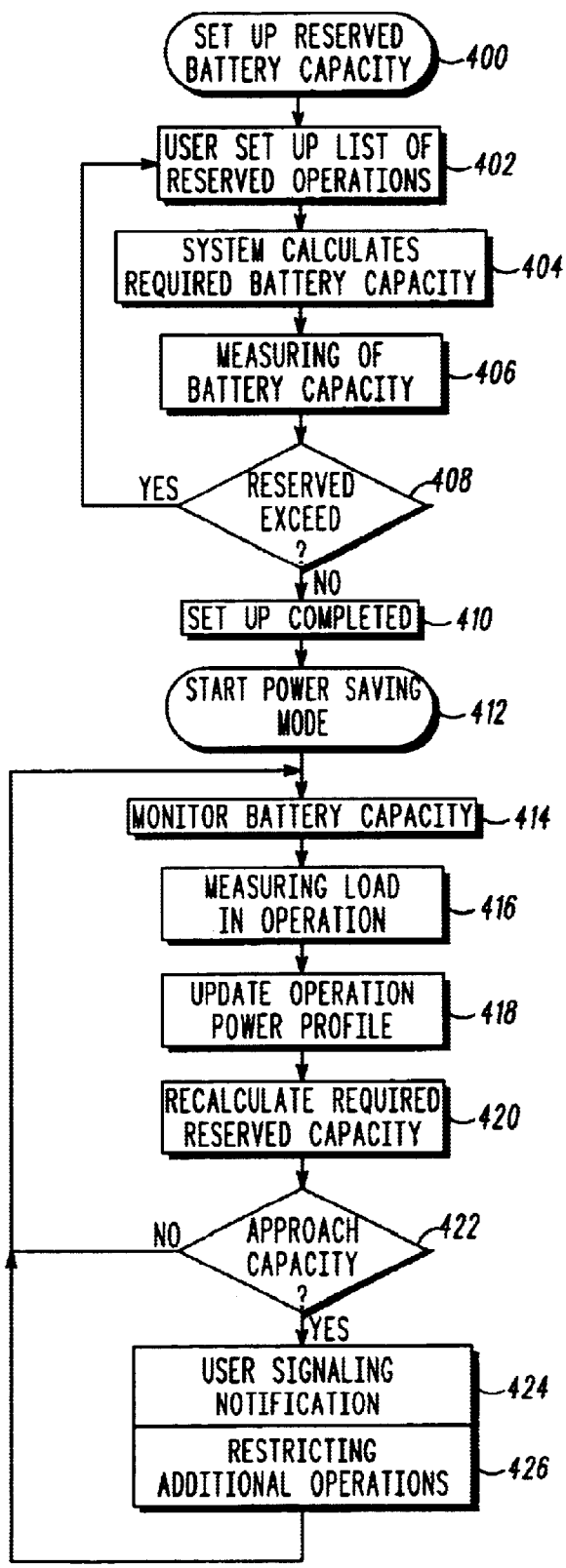
FIG. 4 is a flow chart for a specific first embodiment of the method of FIG. 2.

FIG. 4 demonstrates a detailed flow of the power-saving mode of the present invention. This mode is based on a predicting of consumption due to utilization of power profiles. It determines the required battery capacity to implement pre-defined reserved operations. In this embodiment, the user enters some operating information to the system. This information can include some reserved or mandatory operations, such as the number of desired incoming or outgoing calls or data transmissions of some particular durations of time. In addition, if the user expects some calls and wants to be in a standby mode, the user can define the time period for standby mode (or all the time), plus a small additional amount of capacity for system tolerances due to wireless conditions. These are initial conditions for the power resource monitoring.

As a first step, the system determines 400 available power. The user defines 402 a set of reserved operational modes with a desired time of operation for each. The system then calculates 404 the required total battery capacity, based on initial conditions and power profiles for the operational modes. Preferably, the system actually measures 406 battery capacity. If the operational modes do not exceed capacity 408, the user setup is complete 410. Otherwise, the user must reconfigure the settings 402.

At this point, the device can enter power-saving mode 412. During this time, the system monitors battery capacity 414 and measures or estimates operational load 416. Preferably, the power profiles are updated 418 with this information. Advantageously, the system is adaptive, using dynamic updating of power profiles based on the latest measurements and statistical data from previous operations. Using the battery and load measurements and updated profiles, the system can then recalculate 420 the required reserve capacity, increasing the veracity of power load predictions. Upon approaching 422 of the target lifetime of the available power, the system notifies 424 the user, and restricts any additional operations 426, besides the selected reserved operation without additional permission of the user.

As can be seen from the foregoing, the present invention provides a method and apparatus for reducing the current drain in a communication device using predictive techniques. Advantageously, the present invention predicts power consumption based on power profiles for operational modes for optimizing user utilization of a communication device. It also reduces the total current drain and extends the battery life of a device by limiting the amount of information processed, transmitted and received by the device.

While a particular embodiment of the present invention has been shown and described, modifications may be made. It is therefore intended in the appended claims to cover all such changes and modifications which fall within the broad scope of the invention.

What is claimed is:

1. A method for power resource management in a portable communication device, the method comprising the steps of:

defining power profiles of a plurality of operational modes of the communication device;

calculating available power in a source of power for the communication device;

inputting operating parameters of a selected operational mode; and predicting whether there is sufficient available power for the power profile of the selected operational mode before entry into the selected operational mode, wherein, if there is insufficient available power, restricting operation of at least one of the operational modes of the communication device before entry into the selected operational mode.

2. The method of claim 1, wherein the predicting step includes the substeps of:

calculating the existing power load of the communication device, and comparing the total of the existing power load and the power profile of the selected operational mode to the available power.

3. The method of claim 1, wherein the operating parameters from the inputting step are predefined by a user of the communication device.

4. The method of claim 1, wherein the operating parameters of the inputting step include a time period and a required minimum power for operation of the selected operational mode, and the predicting step includes predicting whether there is sufficient power to operate the selected operational mode at the minimum power during the defined time period, wherein if there is insufficient power, restricting operation of earlier operational modes of the communication device to provide the required minimum power for operation of the selected operational mode during the time period.

5. The method of claim 1, wherein the restricting substep includes preventing entry into the selected operational mode.

6. The method of claim 5, further comprising the substep of providing a user of the communication device an option of changing the operating parameters of the selected operational mode to allow entry therein.

7. The method of claim 1, wherein the restricting substep includes automatically changing the operation of the selected operational mode according to the associated operating parameters of the selected operational mode to allow entry therein.

8. The method of claim 7, wherein the automatically changing substep includes dynamically limiting the rate of information processing of the selected operational mode.

9. The method of claim 8, wherein the limiting substep includes one or more of the group of: limiting the amount of information processed, using a transmission protocol requiring less information, reducing an amount of information displayed, changing to a connectivity interface with lower power consumption, prioritizing processor functions, lowering the quality of transmitted information, and using operating modes with less processor computations.

10. The method of claim 1, further comprising the steps of:
entering the selected operational mode; and
monitoring available power in the communication device, and restricting operation of at least one of the operational modes of the communication device before available power is exceeded.

11. The method of claim 10, wherein the restricting substep of the monitoring step includes providing instructions to a user as to possible techniques to reduce power consumption.

12. The method of claim 10, wherein the restricting substep includes saving internal data of the communication device to a memory.

13. The method of claim 1, wherein the operating parameters of the inputting step includes prioritizing the operational modes, and wherein the restricting substep includes elimininating lower priority operational modes.

14. A method for power resource management in a portable communication device, the method comprising the steps of:
defining power profiles of a plurality of operational modes of the communication device;
calculating available power in a source of power for the communication device;
inputting operating parameters of a selected operational mode;
predicting whether there is sufficient available power for the power profile of the selected operational mode before entry into the selected operational mode, wherein, if there is insufficient available power, restricting operation of at least one of the operational modes of the communication device before entry into the selected operational mode;
entering the selected operational mode; and
monitoring available power in the communication device, and restricting operation of at least one of the operational modes of the communication device before available power is exceeded.

15. The method of claim 14 wherein the operating parameters of the inputting step include a time period and a required minimum power for operation of the selected operational mode, and the predicting step includes predicting whether there is sufficient power to operate the selected operational mode at the minimum power during the defined time period, wherein if there is insufficient power, restricting operation of earlier operational modes of the communication device to provide the required minimum power for operation of the selected operational mode during the time period.

16. The method of claim 14, wherein the restricting substep includes one or more of the group of: preventing entry into the selected operational mode, providing a user of the communication device an option of changing the operating parameters of the selected operational mode to allow entry therein, automatically changing the operation of the selected operational mode according to the associated operating parameters of the selected operational mode to allow entry therein, and limiting the data rate of the selected operational mode.

17. The method of claim 14, wherein the restricting substep includes one or more of the group of: limiting the amount of information processed, using a transmission protocol requiring less information, reducing an amount of information displayed, changing to a connectivity interface with lower power consumption, prioritizing processor functions, lowering the quality of transmitted information, and using operating modes with less processor computations.

18. A portable communication device utilizing power resource management, the communication device comprising:
a battery, the battery providing power to components within and connected to the communication device;
a transceiver included within the communication device, the transceiver adapted to input and output information;
at least one connectivity interface coupled to the transceiver, the interface for inputting and outputting information between the communication device and an external communication device; and
a processor coupled with a memory, the processor adapted to operate it conjunction with a plurality of operational modes of the communication device, wherein the processor calculates available power in the communication device, determines power profiles and operating parameters of the operational modes, such that before the processor is called upon to operate a selected operational mode, the processor calculates whether there is sufficient power for the power profile of the selected operational mode, wherein if there is insufficient power, the processor restricts operation of one or more operational modes of the communication device.

19. The communication device of claim 18, wherein when the processor determines that the available power will be exceeded, the processor will taken action consisting of one or more of the group of: restricting operation of one or more of the operational modes to lower power consumption, warning a user of power limits, providing instructions for a user to optimize utilization of the communication device, and saving internal data of the communication device to a memory.

20. The communication device of claim 18, wherein the operating parameters of a selected operational mode include a time period and a required minimum power for operation of the selected operational mode, and the processor predicts whether there is sufficient power to operate the selected operational mode at the minimum power during the defined time period, wherein if there is insufficient power, the processor restricting operation of earlier operational modes of the communication device to provide the required minimum power for operation of the selected operational mode during the time period.

* * * * *

UNITED STATES PATENT AND TRADEMARK OFFICE
CERTIFICATE OF CORRECTION

PATENT NO. : 6,710,578 B1
DATED : March 23, 2004
INVENTOR(S) : Sklovsky, Vladmir et al.

It is certified that error appears in the above-identified patent and that said Letters Patent is hereby corrected as shown below:

Column 12,
Line 46, change "taken action" to -- take an action --

Signed and Sealed this

Thirtieth Day of November, 2004

JON W. DUDAS
*Director of the United States Patent and Trademark Office*